(12) United States Patent
Green et al.

(10) Patent No.: US 11,041,370 B2
(45) Date of Patent: Jun. 22, 2021

(54) APPARATUS FOR POWER GENERATION

(71) Applicant: TENDEKA B.V., Aberdeen (GB)

(72) Inventors: Annabel Green, Aberdeenshire (GB);
Garth Naldrett, Hampshire (GB);
Calum Crawford, Aberdeenshire (GB);
John Hunter, Westhill (GB); Ian David McWhinnie, Aberdeen (GB);
Tim Collyer, West Sussex (GB)

(73) Assignee: TENDEKA B.V., Aberdeen (GB)

( * ) Notice: Subject to any disclaimer, the term of this patent is extended or adjusted under 35 U.S.C. 154(b) by 0 days.

(21) Appl. No.: 14/760,031

(22) PCT Filed: Jan. 16, 2014

(86) PCT No.: PCT/GB2014/050117
§ 371 (c)(1),
(2) Date: Jul. 9, 2015

(87) PCT Pub. No.: WO2014/118503
PCT Pub. Date: Aug. 7, 2014

(65) Prior Publication Data
US 2015/0345260 A1    Dec. 3, 2015

(30) Foreign Application Priority Data

Jan. 17, 2013  (GB) .................................... 1300861

(51) Int. Cl.
*E21B 41/00*  (2006.01)
*H02K 7/18*  (2006.01)
(Continued)

(52) U.S. Cl.
CPC ....... *E21B 41/0085* (2013.01); *H02K 7/1823* (2013.01); *H02K 11/33* (2016.01); *H02K 15/00* (2013.01)

(58) Field of Classification Search
CPC .... E21B 41/0085; H02K 7/18; H02K 7/1807; H02K 7/1823; H02K 49/102; H02K 49/104; H02K 49/106; H02K 49/108
See application file for complete search history.

(56) References Cited

U.S. PATENT DOCUMENTS 4,725,197 A    2/1988  Russell et al.
4,732,225 A *  3/1988  Jurgens .................... E21B 4/00
                                                      166/66.5

(Continued)

FOREIGN PATENT DOCUMENTS

DE    19706371 A1    8/1998
EP     0520733 A1   12/1992
(Continued)

OTHER PUBLICATIONS

English translation of an Office Action for corresponding Chinese Application No. 201480013587.8 dated Oct. 28, 2016.
(Continued)

*Primary Examiner* — Quyen P Leung
*Assistant Examiner* — Eric Johnson
(74) *Attorney, Agent, or Firm* — Harness, Dickey & Pierce, P.L.C.

(57) ABSTRACT

A power generator for use in a bore, the power generator comprising at least one drivable member; and at least one generation apparatus; the generation apparatus comprising at least one generator magnet for producing a magnetic field; and at least one electrically conductive member located or locatable within the magnetic field; wherein the drivable member is drivable by fluid flowing in the bore so as to produce relative motion of the at least one magnet and the at least one electrically conductive member in order to induce a current in the at least one electrically conductive member.

15 Claims, 11 Drawing Sheets

(51) Int. Cl.
*H02K 15/00* (2006.01)
*H02K 11/33* (2016.01)

(56) References Cited

U.S. PATENT DOCUMENTS

| | | | |
|---|---|---|---|
| 5,265,682 A | 11/1993 | Russell et al. | |
| 5,285,204 A * | 2/1994 | Sas-Jaworsky | E21B 17/203 175/40 |
| 5,517,464 A | 5/1996 | Lerner et al. | |
| 5,839,508 A * | 11/1998 | Tubel | E21B 41/0085 166/65.1 |
| 6,247,533 B1 * | 6/2001 | Brett | E21B 28/00 166/104 |
| 6,279,651 B1 * | 8/2001 | Schwendemann | E21B 41/0035 166/54.1 |
| 6,394,181 B2 * | 5/2002 | Schnatzmeyer | E21B 43/12 166/250.15 |
| 7,190,084 B2 * | 3/2007 | Hall | E21B 41/0085 290/1 R |
| 7,253,536 B2 * | 8/2007 | Fujimoto | E03D 3/00 290/43 |
| 7,434,634 B1 | 10/2008 | Hall et al. | |
| 2004/0265153 A1 * | 12/2004 | Torrey | F04D 13/064 417/423.7 |
| 2005/0012340 A1 * | 1/2005 | Cousins | H02P 6/15 290/52 |
| 2005/0200210 A1 | 9/2005 | Kotsonis et al. | |
| 2005/0207279 A1 * | 9/2005 | Chemali | E21B 17/028 367/83 |
| 2006/0113803 A1 * | 6/2006 | Hall | E21B 41/0085 290/54 |
| 2008/0240909 A1 | 10/2008 | Winnacker et al. | |
| 2009/0236149 A1 | 9/2009 | Main | |
| 2010/0001529 A1 * | 1/2010 | Rosefsky | H02K 99/10 290/52 |
| 2010/0041939 A1 * | 2/2010 | Siess | F04D 13/0626 600/16 |
| 2010/0071910 A1 * | 3/2010 | Ellson | E21B 41/0085 166/385 |
| 2010/0253167 A1 * | 10/2010 | Charnley | H02K 7/088 310/83 |
| 2012/0139250 A1 | 6/2012 | Inman et al. | |

FOREIGN PATENT DOCUMENTS

| | | |
|---|---|---|
| EP | 0681090 A2 | 11/1995 |
| GB | 2165592 A | 4/1986 |
| GB | 2412017 A | 9/2005 |
| WO | WO-2011/020978 A1 | 2/2011 |

OTHER PUBLICATIONS

International Search Report PCT/ISA/220 for International Application No. PCT/GB2014/050117 dated May 30, 2014.
International Written Opinion PCT/ISA/237 for International Application No. PCT/GB2014/050117 dated May 30, 2014.
Great Britain Search Report for corresponding Application No. GB1300861.0 dated May 1, 2013.
United Kingdom Examination Report for corresponding Application No. GB1300861.0, dated Oct. 28, 2019.

* cited by examiner

APPARATUS FOR POWER GENERATION

FIELD

Embodiments described herein relate generally to apparatus for power generation and particularly but not exclusively to apparatus for use in pipelines or other conduits for carrying fluid, for example, in downhole environments found in the oil and gas exploration and extraction industry.

BACKGROUND

Use of powered systems in downhole environments, such as those found in the oil and gas exploration and extraction industries, is well known. Such powered systems can include, for example, actuation systems requiring mechanical operation such as chokes, valves, etc., sensors such as pressure sensors, communications systems, diagnostic systems, and/or the like. Power for operation of these systems can be provided by batteries. However, in practice, the operational life of the battery can be significantly reduced due to the challenging environmental conditions found downhole.

STATEMENTS OF INVENTION

According to a first aspect of the invention is a power generator, the power generator comprising:
 at least one drivable member; and
 at least one generation apparatus; the generation apparatus comprising:
  at least one generator magnet for producing a magnetic field;
  at least one electrically conductive member located or locatable within the magnetic field;
 wherein the drivable member is drivable so as to produce relative motion of the at least one magnet and the at least one electrically conductive member.

The at least one generator magnet may comprise a permanent and/or electromagnet.

The at least one electrically conductive member may comprise a coil and/or windings.

The power generator may be configured to be located within a wellbore. The power generator or at least the drivable member may be configured to be located in a conduit for carrying flowing fluid. The conduit may comprise the wellbore and/or a tubular provided within the wellbore. The flowing fluid may comprise liquid and/or gas. The drivable member may be drivable by the flowing fluid, e.g. the drivable member may be rotatable by the flowing fluid. The power generator may be locatable and/or configured such that a longitudinal axis of the generator extends in the direction of fluid flow. The drivable member may be configured so as to extend substantially perpendicularly to the flowing fluid. The power generator may be an elongated power generator, wherein the power generator may be configured such that, in use, the long axis of the power generator extends substantially in the direction of fluid flow. The outside diameter of the power generator may be less than 8 cm. Preferably, the outside diameter of the housing and/or drivable member may be less than 7 cm.

The at least one generation apparatus may comprise at least one rotor and at least one stator. The at least one generator magnet or the at least one electrically conductive member may be comprised in or provided on the at least one stator. The other of the at least one generator magnet or the at least one electrically conductive member may be comprised in or provided on the at least one rotor. The rotor may be provided inwardly of the stator or, alternatively, the stator may be provided inwardly of the rotor. The rotor and stator may at least partially overlap in a direction along the rotational axis of the rotor.

The drivable member may comprise or be fixed or fixable to a drive shaft. The drivable member may be selectively releasable from the drive shaft.

The at least one drivable member may be coupled or coupleable to at least part of the at least one generation apparatus via at least one connector. The at least one connector may comprise a spline connector and/or a magnetic coupling and/or the like.

The rotor may comprise, be coupled to or mounted to a rotatable rotor shaft. The rotor shaft may be separate from or integral with the drive shaft. When the rotor shaft is separate from the drive shaft, the at least one connector may be provided between the drive shaft of the drivable member and the rotor or rotor shaft.

The spline connector may comprise a plurality of splines provided on one of the drive shaft or the rotor shaft and a plurality of corresponding recesses on the other of the drive shaft or the rotor shaft, such that that the splines and recesses are relatively slidable along a longitudinal axis of the drive and/or rotor shafts but are interengageable circumferentially such that the rotor shaft and drive shaft rotate together.

The magnetic coupling may comprise one or more first and second cooperatively arranged coupling magnets configured such that rotation of the first coupling magnet(s) acts to exert a magnetic force on the second coupling magnet(s), the exerted magnetic force acting to rotate the second coupling magnet(s). The first coupling magnet(s) may be rotatable by driving the at least one drivable member, e.g. by being provided on or coupled with the drive shaft. The second coupling magnet(s) may be provided on or coupled with the rotor shaft, e.g. such that the magnetic force exerted on the second set of magnets exerted by the first set of magnets acts to rotate the rotor shaft.

The magnetic connector may be integrated into the generation apparatus. The second coupling magnets may comprise or be comprised in the at least one generator magnet of the generation apparatus.

The at least one electrically conductive member and/or stator and/or power conditioning apparatus and/or any electronic components may be provided behind a screen or pressure barrier relative to the fluid that drives the drivable member. The rotor and/or the at least one generator magnet may be provided on another side of the screen or pressure barrier and may be configured to be exposed to the fluid that drives the drivable member. The screen or pressure barrier may be comprised in or formed by the housing, e.g. the screen or pressure barrier may be integral with the housing. The screen or pressure barrier may be metallic. The screen or pressure barrier may be provided between the first and second coupling magnets or between the first or second coupling magnets and the generator magnets or between the generator magnets and the at least one electrically conductive member. The screen or pressure barrier may divide the housing into a plurality of chambers.

The drivable impeller may be configured to be self limiting, for example, by having a maximum rotation speed.

The at least one drivable member may comprise an impeller. The impeller may comprise a plurality of blades, for example, six or more blades and preferably eight or more blades. The plurality of blades may be mounted on a mounting member, e.g. a boss. The mounting member of the impeller may be selectively connectable and releasable to the drive shaft, e.g. to facilitate easy changing of the impeller. The impeller may comprise an annular member, such as an annular sheath or guide. A part of at least one and optionally each blade may be fixed, attached, mounted to or integral with the annular member. The part of the blade(s) connected to the annular member may comprise an end of the blade(s) that is opposite to an end of the blade(s) that is mounted to the mounting member. The impeller may comprise a mixed flow impeller.

The at least one drivable member may comprise a grooved member such as a member having one or more grooves or channels, at least part of which may be obliquely oriented to the direction of fluid flow, for example, the one or more grooves or channels may comprise spiral or screw grooves or channels.

The at least one drivable member may comprise at least one protrusion, at least part of which may be obliquely oriented to the direction of fluid flow, for example, the at least one protrusion may comprise a spiral, screw or helix. The at least one drivable member may comprise a conical member and the at least one protrusion or groove may be provided on the conical member.

The power generator may comprise a plurality of drivable members. At least one of the drivable members may be different or a different type to at least one other of the drivable members. For example, the drivable members may comprise at least two of an impeller and/or a grooved member and/or a member comprising at least one protrusion.

The power generator may comprise and/or be connected or connectable to a power storage device, for example, a portable power storage device, such as a battery. The generation apparatus may comprise power conditioning apparatus, which may comprise, for example, at least one transformer. The generation apparatus may be configured to trickle charge the power storage device.

The at least one drivable member may be coupled to the at least one generation apparatus via a gearing mechanism. For example, the drive shaft may be coupled or connected to an input of the gearing mechanism and the rotor shaft may be coupled or connected to an output of the gearing mechanism. The output of the gearing mechanism may comprise an output gear and the input of the gearing mechanism may comprise an input gear, wherein the output gear may be rotatable by rotation of the input gear. The gearing mechanism may be arranged such that a rotation speed input to the gearing mechanism by the drive shaft and/or drivable member is lower than a rotation speed output by the gearing mechanism. The gearing mechanism may comprise a planetary or epicyclic gearbox.

The power generator may comprise a housing. The generation apparatus may be provided within the housing. The housing may comprise a shroud provided outwardly of the at least one drivable member, e.g. such that the at least one drivable member is provided within the shroud. The housing may comprise a generator housing, which may be releasably attachable or connectable to the shroud. The shroud may be configured to divert fluid flow to the impeller. The generating apparatus may be provided within the generator housing. One or more housing seals, such as O-rings, may be provided between the shroud and the generator housing. The housing may comprise or be selectively attachable or connectable to a crossover sub.

A first end of the housing, which may be an end configured to be an up-hole facing end in use, may be provided with chamfered edges, such as edges that are chamfered between 10° and 60°, e.g. 30°. A second end of the housing, which may be an end configured to be an downhole facing end in use, may be provided with chamfered edges, such as edges that are chamfered between 10° and 60°, e.g. 30°.

The housing may comprise a main body mounted housing. The housing may comprise or be attachable to a nose cap or cone.

The power generator may comprise or be configured to receive at least one flow diversion member for diverting fluid flow to the drivable member. The flow diversion member may be provided or providable on the outside diameter of the housing. The flow diversion member may comprise a swellable member. The swellable member may be swellable by the fluid that drives the at least one drivable member.

The power generator may comprise one or more seals which may be configured to seal between the drive shaft and/or rotor shaft and the housing. The one or more seals may comprise lip seals and/or wiper seals and/or rod seals. The one or more seals may comprise a fluoroplolymer, fluoroelastomer and/or synthetic rubber such as such Viton®, PTFE, or the like. The housing may be provided with a greaseway. The greaseway may comprise one or more openings. At least one of the greaseway openings may be provided proximate one or more of the seals. The greaseway may be configured to control the pressure between two or more seals.

The gearing mechanism may be arranged such that the one or more seals seal against a portion of the drive shaft or rotor shaft on the more slowly rotating (e.g. input) side of the gearing mechanism.

The drive shaft and the rotor shaft may be formed by, comprise or be comprised within a unitary shaft, i.e. a single unitary shaft. The drive shaft and/or rotor shaft and/or unitary shaft may be mounted on the housing by one or more bearings. The one or more bearings may comprise plain or rotary bearings. The one or more bearings may comprise polymeric bearings.

The power generator may be configured such that components such as at least one and optionally each of the bearings and/or at least one of the first magnets and/or the second magnets of the magnetic coupling and/or the generator magnets are exposed to the fluid that drives the drivable member in use. The power generator may be filterless, e.g. the component(s) exposed to the fluid may be directly exposed to the fluid without being filtered.

The power generator may be configured such one or more of the seals is provided between that at least one and optionally each of the bearings and the fluid in use.

The power generator may be provided with one or more debris collection magnets, which may be provided in the fluid stream, preferably upstream of the at least one generator magnet.

According to a second aspect of the present invention is a downhole assembly comprising at least one powered device and at least one power generator according to the first aspect.

The at least one powered device may comprise, be comprised in or associated with one or more sensors and/or measurement devices and/or diagnostic devices and/or communications devices and/or control devices.

The at least one powered device may be powered directly or indirectly by the at least one power generator. The downhole assembly may comprise one or more power storage devices, such as batteries. The at least one powered device may be powered by the power storage device. The power generator may be configured to recharge the power storage device. The power generator may be configured to trickle charge the power storage device.

According to a third aspect of the present invention is a method for generating power comprising providing a power generator according to the first aspect and exposing the drivable member of the power generator to fluid flow in order to drive the drivable member.

According to a fourth aspect of the present invention is a method of installing a power generator according to the first aspect of the present invention comprising providing a power generator of the first aspect in a well bore.

According to a fifth aspect of the present invention is a drivable member for a power generator according to the first aspect of the present invention.

It will be appreciated that features analogous to those described above in relation to any of the above aspects may be individually and separably or in combination applicable to any of the other aspects.

Apparatus features analogous to those described above in relation to a method and method features analogous to those described above in relation to an apparatus are also intended to fall within the scope of the present invention.

BRIEF DESCRIPTION OF THE DRAWINGS

Embodiments are now described, by way of non-limiting example, and are illustrated in the following figures, in which.

DETAILED DESCRIPTION OF THE DRAWINGS

Figure 1:
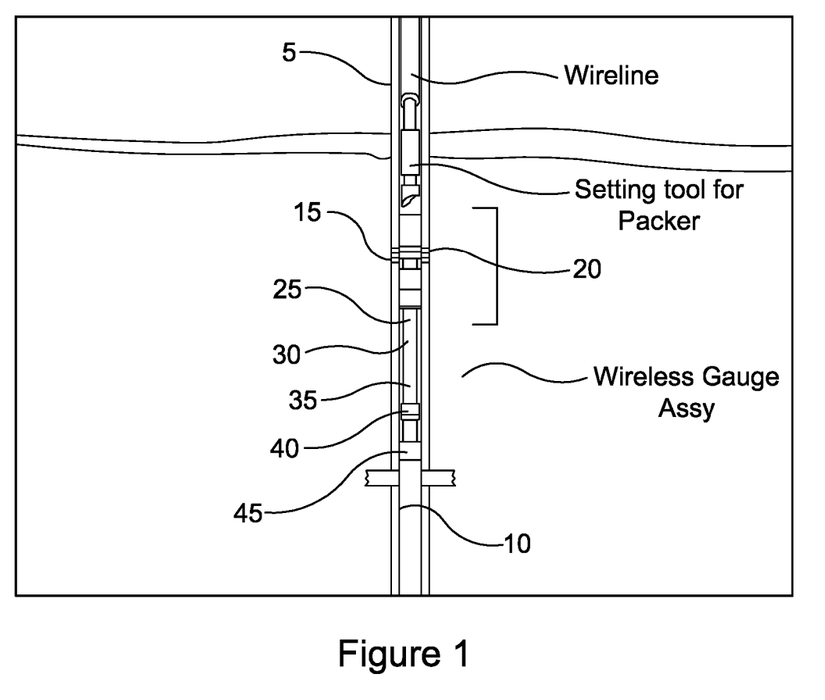
FIG. 1 shows a prior art wireless downhole sensor system in use.
Figure 2:
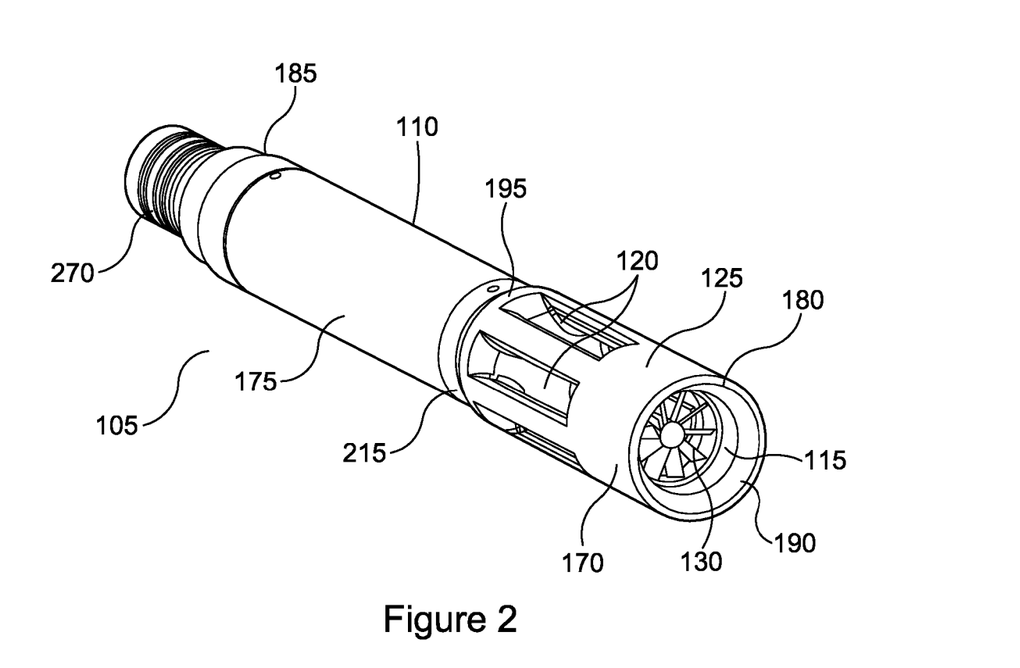
FIG. 2 shows a perspective view of a power generator according to the present invention.
Figure 3:
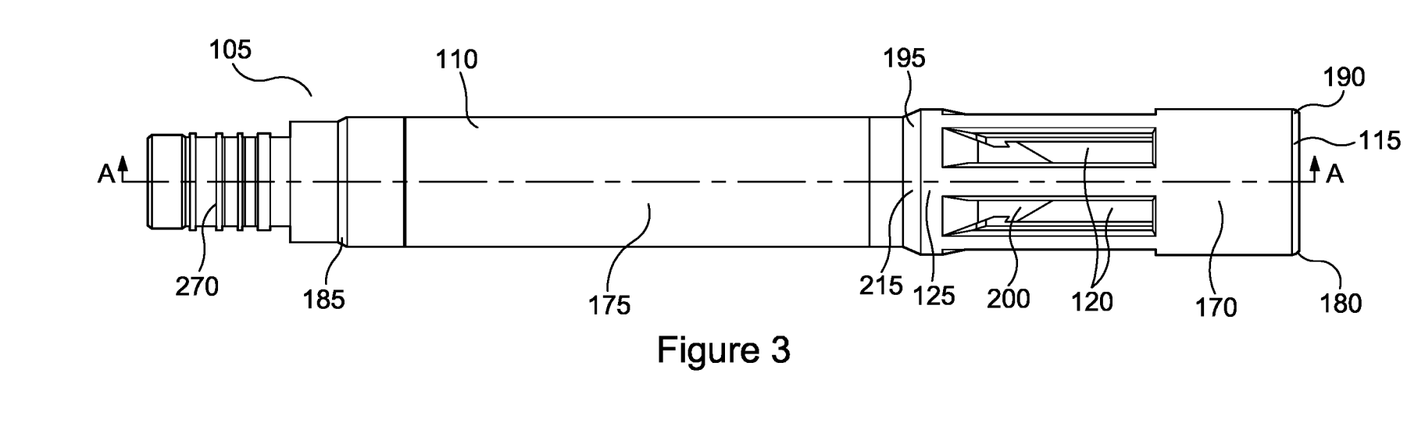
FIG. 3 shows a side view of the power generator of FIG. 2.

Use of electrical systems in downhole environments is well known. FIG. 1 shows an example of a prior art downhole system in which a tubular conduit 5 is provided to line a well bore 10. A downhole apparatus 15, in this case a pressure sensor, is lowered into the tubular 5. For example, the apparatus 15 is provided with a wireline set packer 20, a choke/choke cage module 25, an actuator module 30, a sensor module 35 containing the pressure sensor and associated electronics provided downhole of the choke, a lithium battery unit 40 for powering the pressure sensor and other electronics and electrical devices such as the choke 25 and a centralizer 45 for centering the apparatus 15 in the tubular 5.

Although such systems are popular and well used, the lifetime of the battery unit 40 is often reduced significantly due to the adverse conditions present in downhole environments. Furthermore, removal of such downhole apparatus 15 can often lead do delays in operation, which may be costly. As such, it would be beneficial to improve the operational lifetime of the downhole apparatus 15 before removal of the apparatus from the well bore 10 is necessary.

FIGS. 2 to 7 show an embodiment of a power generator 105 configured for operation in downhole environments, particularly to be received within the tubular casing 5 of a wellbore 10. For example, the power generator 105 can be used to charge the battery unit 40 of the downhole apparatus 15 shown in FIG. 1.

The power generator 105 comprises a hollow housing 110 that defines an inlet 115 at one end thereof and a plurality of outlets 120 arranged circumferentially around a side wall 125 of the housing 110 such that the outlets 120 open tangentially to the inlet 115. An axial flow type drivable member is provided within the housing 110 between the inlet 115 and the outlets 120. The drivable member 130 is provided with a polished or near polish finish in order to minimise scale build up. The drivable member 130 is releasably mounted on a drive shaft 135 which is rotatably mounted on the housing 110 via a plurality of bearings 140, 145. A plurality of generator magnets 150 are provided on the drive shaft 135. In this case, the drive shaft 135 acts as a rotor shaft of an electrical generator apparatus 155. Generator windings 160 comprising one or more wires formed of conductive material are mounted on the housing 110 and located outwardly of and proximate the generator magnets 150. As will be appreciated, in this case, the generator windings 160 are comprised in a stator of the electrical generator apparatus 155.

A pressure barrier 165 in the form of a portion of the housing 110 is provided in order to isolate the generator windings 160 from the fluid. The pressure barrier is metallic, e.g. formed from titanium, inconel or the like. One or more seals 230 are provided between the housing 110 and the drive shaft 135 such that the bearings 140, 145 and generator magnets 150 are provided on one side of the seals 230 and the drivable member 130, inlet 115 and outlets 120 are provided on another side of the seals 230.

The generator apparatus is configured to trickle charge a battery unit, such as the battery unit 40 of the system of the downhole apparatus 15 of FIG. 1. The generator apparatus 155 comprises a 12 pole, fractional slot 3 phase alternator. The generator magnets 150 comprise twelve permanent magnetic poles formed from rare earth magnetic material such as Recoma 32. The magnetic poles are mounted on a hub, which is optionally formed from stainless steel. The generator apparatus 155 is configured to produce an output in the range of 8 to 15 V d.c. after rectification, preferably substantially 12V d.c. and a total output into three phase load of less than 2 W, and optionally less than 0.5 W, such as 0.3

W. The generator apparatus is also configured to produce a current of less than 200 mA, and preferably less than 50 mA, e.g. 20 mA.

The housing 110 comprises a shroud 170 and a generator housing 175. A cross over sub 270 is attachable to the generator housing 175. Any uphole and downhole leading edges 180, 185 of the housing 110 are chamfered, e.g. at between 30° and 35° angles, in order to allow easy insertion and removal of the power generator 105 downhole and minimise the chances of snagging.

The shroud 170 comprises a cylindrical hollow casing member that covers the outside of the drivable member 130 and comprises the inlet 115 and outlets 120. The shroud 170 is configured to divert fluid flow to the drivable member 130 in addition to protecting the drivable member 130 during deployment. In this way, one size of power generator 105 may be used for a range of tubular 5 sizes. A first end 190 of the shroud 170 defines the inlet 115, the side wall 125 of the shroud 170 defines the outlets 120 and a second end 195 of the shroud 170 that is opposite to the first end 190 defines a protrusion 200 that protrudes inwardly towards the inlet 115 to partially close the second end 195 of the shroud 170. The protrusion 200 comprises an aperture 205 such that the drive shaft 135 can pass through the aperture so as to extend between the insides of the shroud 170 and generator housing 175. The second end 195 of the shroud 170 comprises a connector 210 for connecting the shroud 170 to the generator housing 175.

Optionally, the power generator 105 comprises or is configured to receive at least one flow diversion member (not shown) on the outside of the housing 110 for diverting flow to the drivable member 130. In one example, the flow diversion member comprises a swellable member that is swellable by the fluid that drives the at least one drivable member 130. In this way, when the device is in use, the swellable member(s) can swell due to the flowing fluid in order to seal or at least partially seal between the power generator 105 and the inner walls of the tubular casing 5 or wellbore 10 such that more or all of the flow can be diverted to the drivable member 130.

The power generator 105 is optionally provided with debris collection magnets for collecting ferrous debris. For example, the debris collection magnets can be provided in safe areas, such as upstream of the generator magnets 150, in order to protect components in contact with well fluids. The connector 210 comprises any suitable connection means known in the art, such as but not limited to threaded means, inter-engaging means, interlocking means and the like.

The power generator 105 is configured to be mountable within a wellbore 10 so that the inlet 115 faces a fluid flow within the wellbore 10 such that the fluid flows into the housing 110 through the inlet 115 and then radially out of the housing 110 through the outlets 120 via the drivable member 130. The protrusion 100, such as a dome shaped member, acts to help deflect the fluid flow radially out through the outlets 120 and reduces the fluid pressure on the aperture 205 through which the drive shaft 135 passes into the generator housing 175. Optionally, one or more swellable packer (not shown) can be provided on the side surface 125 of the housing. The swellable packer can be configured to swell in the fluid flowing in the well bore in order to extend between the housing 110 and the tubular 5 in order to prevent fluid flow from bypassing the generator and to dampen vibration.

The generator housing 175, the generator magnets 150 and the generator windings 160 together form generation apparatus 155 according to the present invention.

The generator housing 175 defines a hollow housing member having a first end 215 that comprises a connector 220 corresponding to the connector 210 of the shroud 170 such that the shroud 170 can be releasably fixed to the first end 215 of the generator housing 175. The first end 215 of the generator housing 175 also defines an aperture 225 for receiving the driveshaft 135 therethrough. The aperture 225 of the generator housing 175 is sealed by the at least one seal 230.

Figure 4:
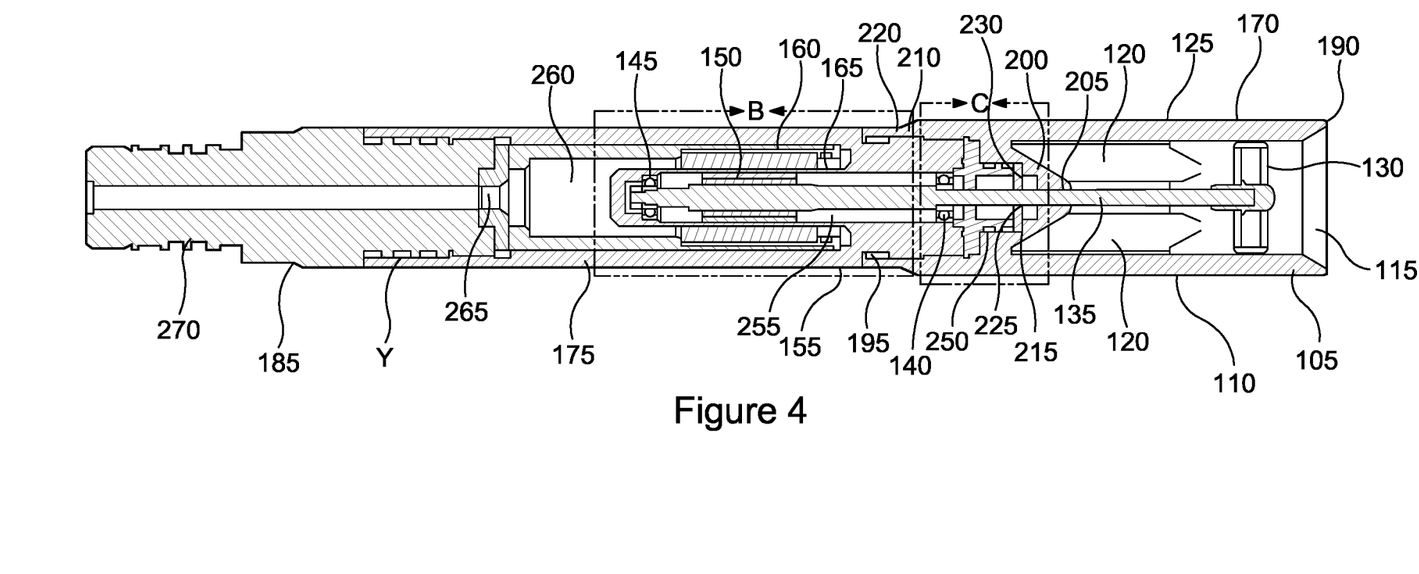
FIG. 4 shows a cross sectional view of the power generator of FIG. 3 through section A-A.
Figure 5:
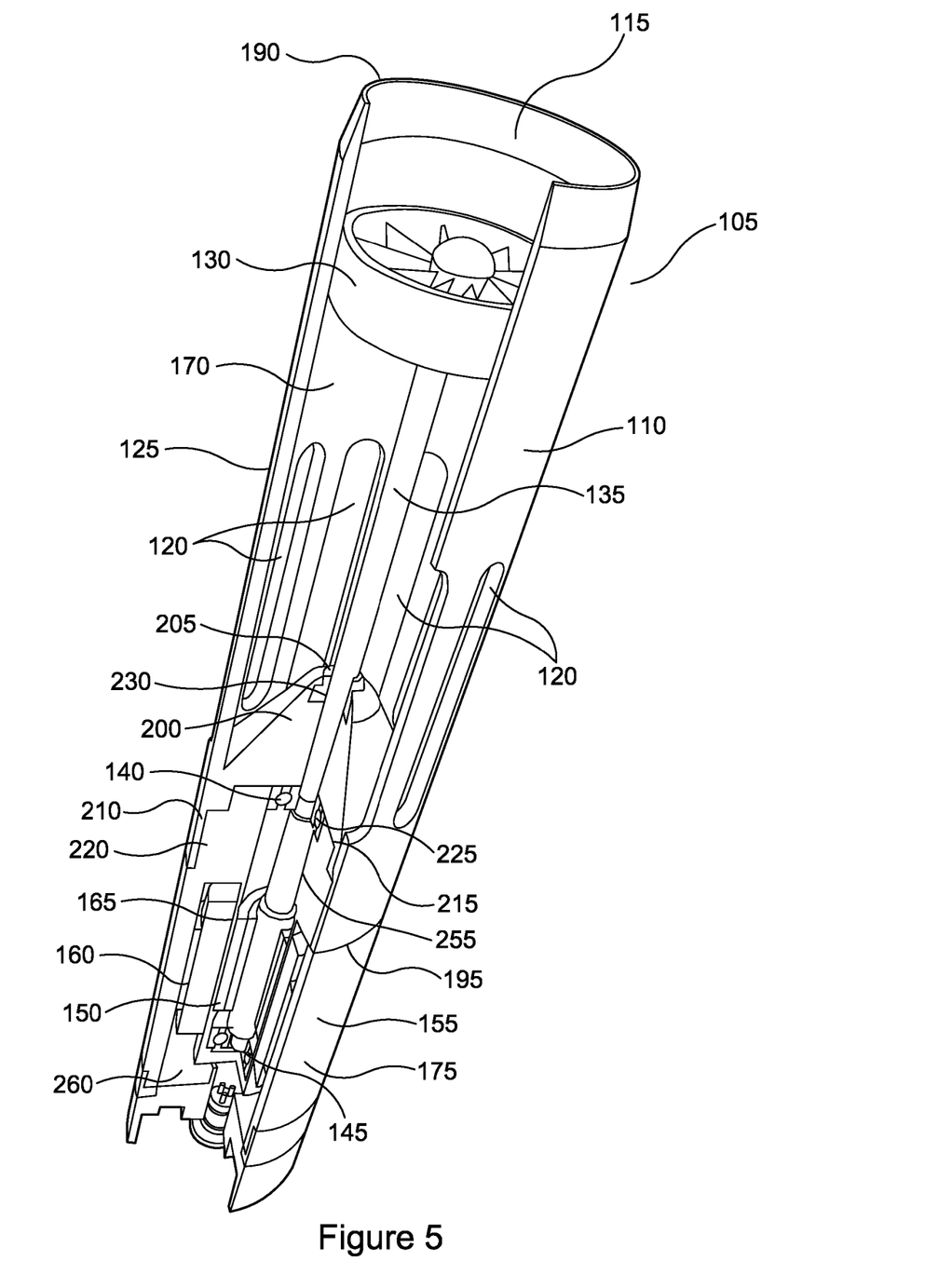
FIG. 5 shows a perspective cut-away view of the power generator of FIGS. 2 to 4.
Figure 6:
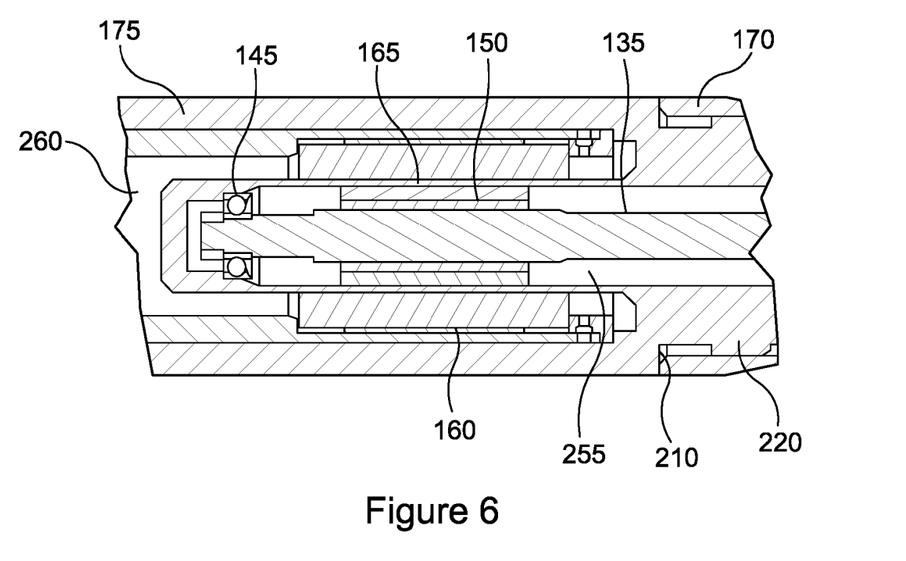
FIG. 6 is a detailed cross sectional view of the region marked section A in FIG. 8 and section B in FIG. 4.
Figure 7:
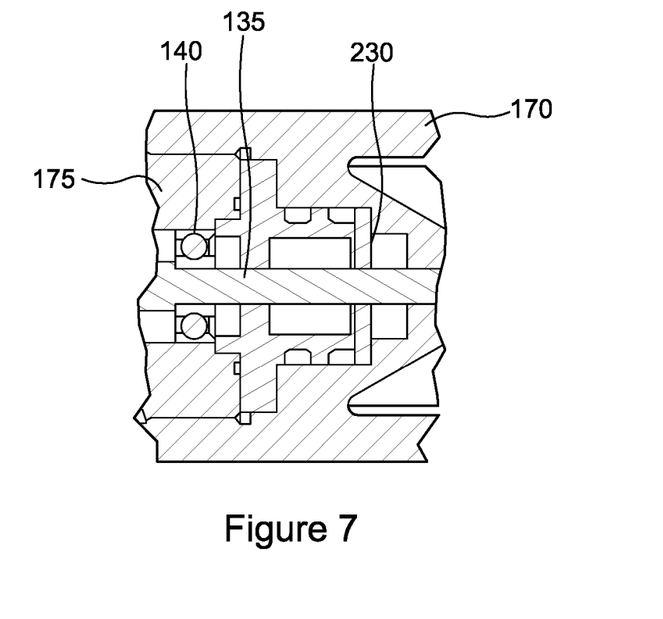
FIG. 7 is a detailed cross sectional view of the region marked section C in FIG. 4.
Figure 8:
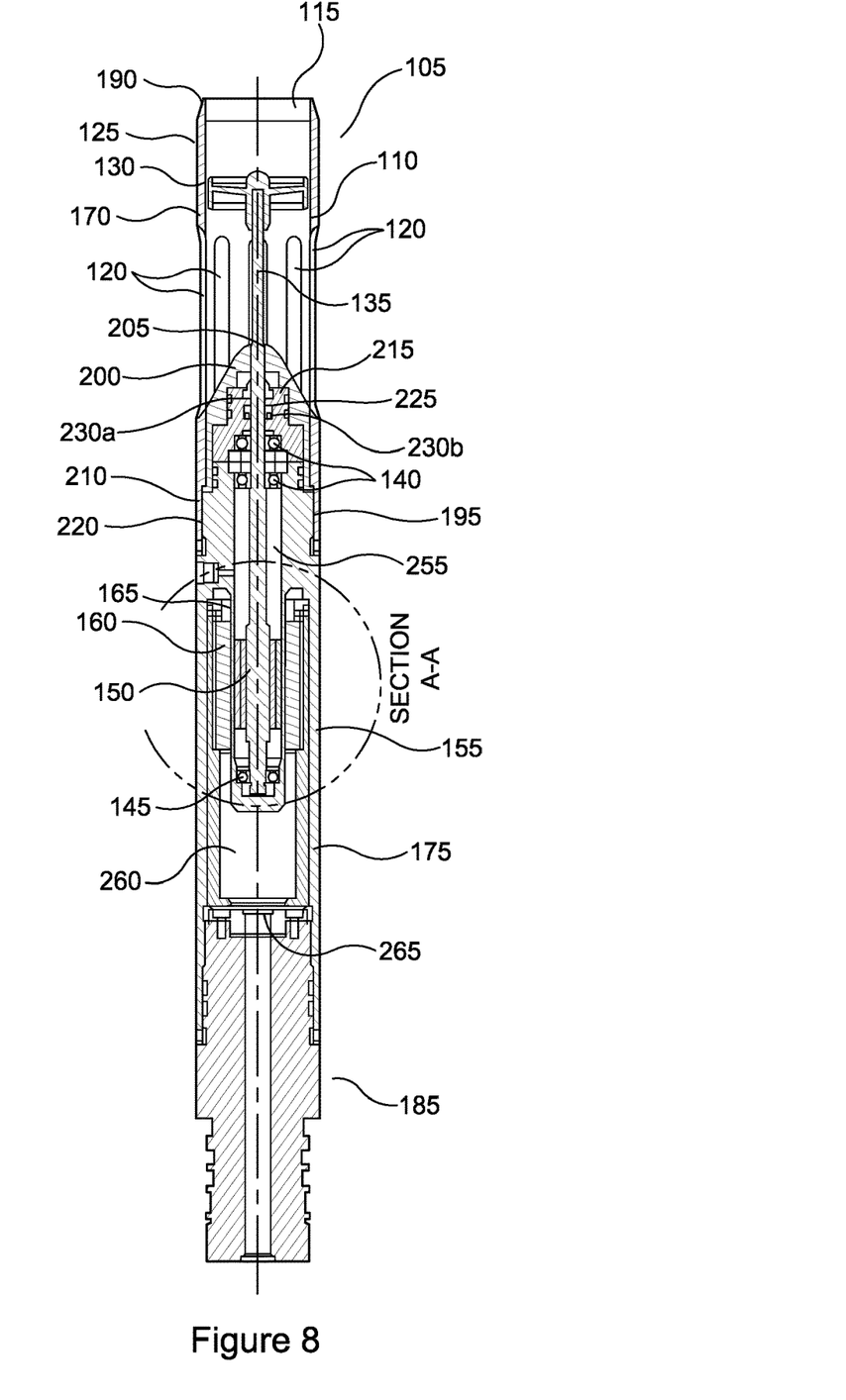
FIG. 8 shows a cross sectional view of an alternative power generator according to the present invention.
Figure 9:
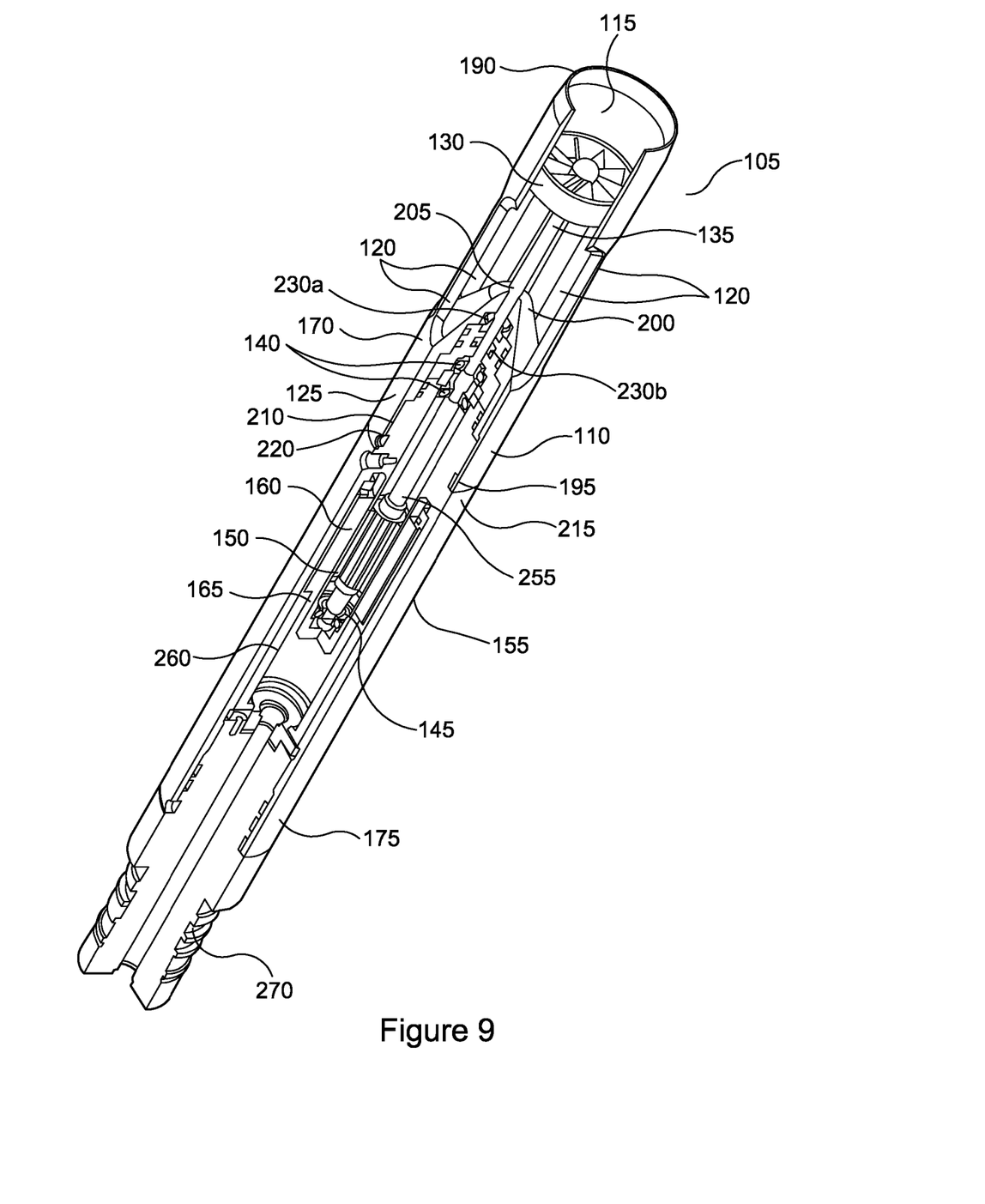
FIG. 9 shows a cut-away perspective view of the power generator of FIG. 8.

In the embodiment of FIGS. 2 to 7, the seal 230 is provided by one or more lip seals (see e.g. FIGS. 4, 5 and 7). However, it will be appreciated that other suitable sealing mechanisms may be used. For example, as shown in the embodiment of FIGS. 8 and 9, a plurality of different seal types 230a, 230b are used, such as a wiper seal 230a in combination with a rotary pressure seal such as a rod seal 230b.

Figure 10:
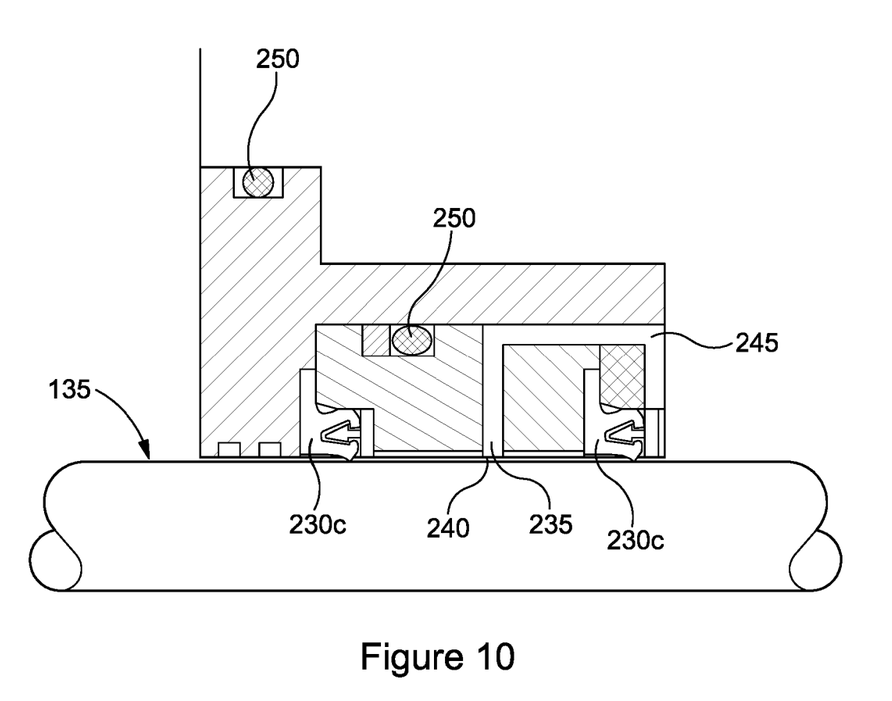
FIG. 10 shows a cross sectional view of an alternative sealing arrangement for a power generator.

FIG. 10 shows an alternative sealing arrangement that could be used. In this arrangement, the seals comprise at least a pair of fluoroploymer seals 230c, such as PTFE seals and a greaseway 235. The greaseway 235 is packed with grease and is open at an end 240 between the seals 230c and at another end 245 toward the external fluid flow, in order to equalise the pressure between the seals 230c.

The connections 210, 220 between the shroud 170 and the generator housing 175 can be further sealed with connection seals 250 such as Viton® or perfluoroelastomeric O-rings.

The bearings 140, 145 for mounting the drive shaft 135 on the housing 110 are provided spaced apart within the generator housing 175, for example, with a first set of bearings 140 being provided proximate the first end 215 of the generator housing 175 and the second set of bearings 145 being provided proximate an end of the drive shaft 135 that is closest to the second end of the generator housing that is opposite the first end 215. In the embodiment of FIGS. 2 to 7, only a single first set of bearings 140 is provided, whereas in the embodiment of FIGS. 8 and 9 two sets of first bearings 140 are provided. However, it will be appreciated these arrangements are only exemplary and that other arrangements of bearings 140, 145 would be apparent to a skilled person.

As examples, the bearings 140, 145 can comprise roller/ball type bearings such as cylindrical plain bearings or polymeric plain bearings (e.g. fibre reinforced thermoplastic bearings) but could comprise any other suitable bearing type, such as a deep roof rotary bearing and could optionally comprise a self sealed bearing, as would be apparent to a person skilled in the art.

The generator housing 175 comprises or forms a barrier 165 that seals the generator windings 160 from any fluid or other matter that may enter into the generator housing 175. In this way, the generator housing 175 is essentially divided into two separate chambers 255, 260 by the barrier 165, the first chamber 255 containing the bearings 140, 145 and drive shaft 135 and the other chamber 260 containing the generator windings 160 and any associated electronics and power conditioning apparatus. The other chamber 260 is air filled whilst the first chamber 255 is filled with a second fluid that differs from the fluid that drives the drivable member 130. For example, the second fluid could comprise mineral oil.

The second end of the generator housing 175 is provided with an electrical connector 265 that is in turn connected to the generator windings 160 (via any power conditioning apparatus if required). The second end of the generator housing 175 also comprises suitable connection means, for example, for attaching the power generator 105 to a string, optionally via a crossover sub 270 if required.

The power generator 105 is configured for use at temperatures up to 150° C. and pressures under 700 bar.

It will be appreciated that, in use, fluid flow in the tubular 5 enters the power generator 105 via the inlet 115 and acts on the drivable member 130 resulting in rotation of the derivable member 130 before being deflected by the protrusion 200 and exiting the power generator 105 radially/tangentially via the outlets 120. The rotation of the drivable member 130 rotates the drive shaft 135 which in turn rotates the generator magnets 150. The generator windings 160 are arranged in the magnetic field of the generator magnets 150 such that the rotation of the generator magnets 150 varies the magnetic field experienced by the generator windings 160 and induces an electrical current in the generator windings 160.

By providing the drivable member 130 such that it is releasable from the drive shaft 135, worn or damaged drivable members 130 can be easily replaced and the power generator 105 can be more easily assembled.

Since the generator housing 175 comprises/forms a barrier 165 that isolates the generator windings 160 from the fluid, the generator windings 160 can be protected from damage due to the fluid, e.g. by wear or abrasion or by the application of fluid forces, even if the seals 230 are compromised.

By providing seals 230 between the housing 110 and the drive shaft 135, wherein the seals 230 are seal the bearings 140, 145 and generator magnets 150 from the inlet 115 and outlets 120, the bearings 140, 145 and generator magnets 150 are protected from damage due to the fluid and/or particulate matter carried by the fluid, e.g. by wear or abrasion or by the application of fluid forces.

Use of the power generator 105 allows the batteries 40 of powered downhole apparatus 15 to be recharged in situ, thereby reducing or eliminating the need to withdraw the apparatus 15 to the surface to recharge or replace the batteries 40.

Figure 11:
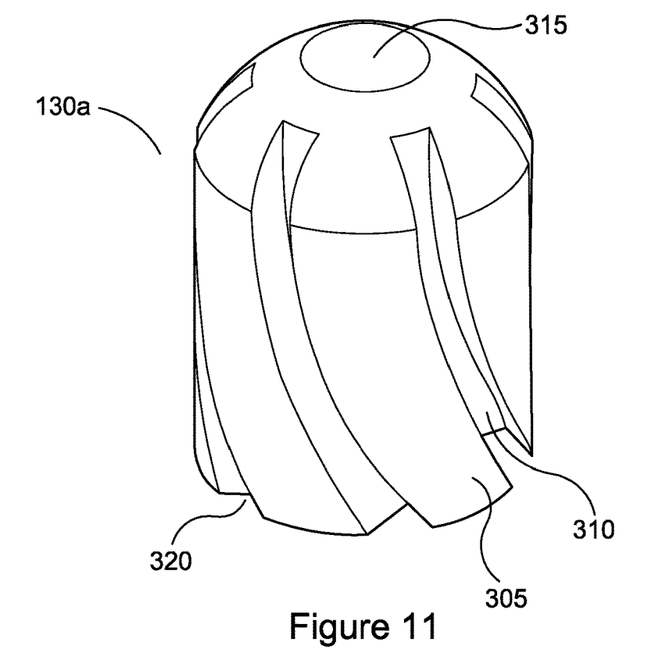
FIG. 11 shows a perspective view of a drivable member in the form of a grooved member for use with a power generator.

An example of a suitable drivable member 130a for use in embodiments of the power generator of the present invention is shown in FIG. 11. In this embodiment, the drivable member 130a is in the form of a body 305 that has been provided with a plurality of obliquely running grooves or channels 310. The grooves or channels 310 run obliquely from a first (upstream) end 315 of the body 305 to a second (downstream) end 320. The first end 315 of the body 305 is radiused to guide the fluid flow. The grooves or channels 310 are formed such that, in use, fluid flowing in the grooves or channels 310 causes the drivable member 130a to rotate. A drivable member 130a of this type is relatively simple and cheap to manufacture, for example by machining the grooves 310 in a solid body 305 of material or by appropriately moulding or casting the drivable member 130a. Furthermore, this type of drivable member 130a may be relatively robust, solidly constructed and have a large amount of sacrificial material, potentially improving lifetime.

Figure 12:
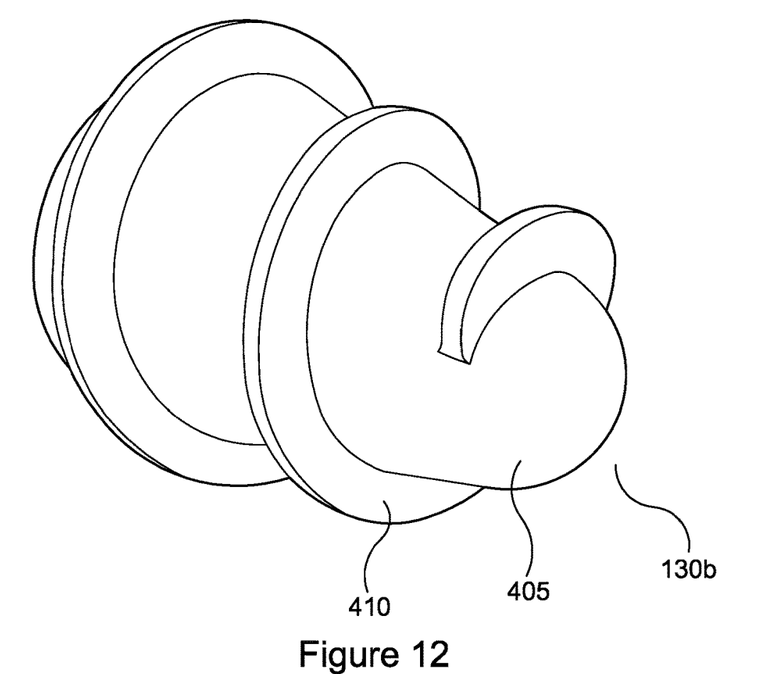
FIG. 12 shows a perspective view of a drivable member in the form of a screw member for use with a power generator.

Another example of a suitable drivable member 130b for use in embodiments of the power generator 105 of the present invention is shown in FIG. 12. In this embodiment, the drivable member 130b comprises a conical body 405 that has a spiral or screw shaped protrusion 410 on its outer surface. The protrusion 410 can be suitably angled such that, in use, fluid flowing over the drivable member 130b acts on the protrusion 410 so as to rotate the drivable member 130b.

Figure 13:
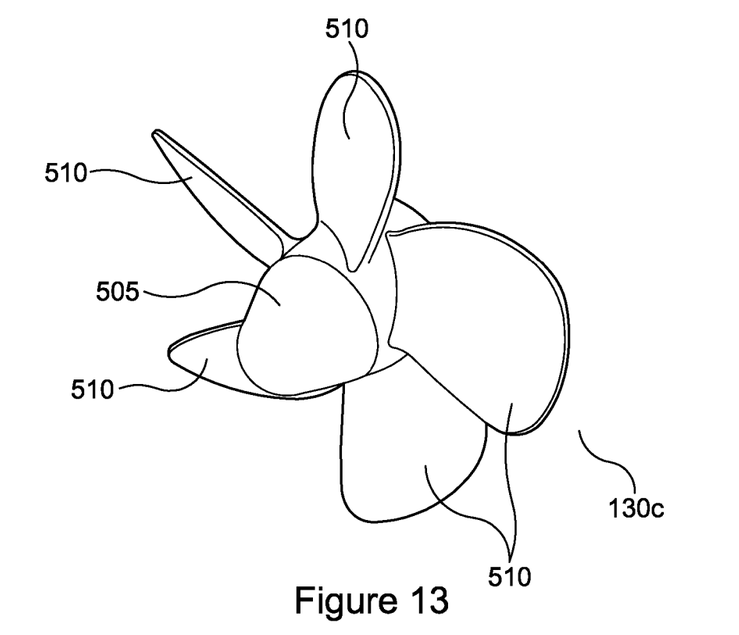
FIG. 13 shows a perspective view of a drivable member in the form of an impeller for use with a power generator.

Another example of a suitable drivable member 130c for use in embodiments of the present invention is shown in FIG. 13. In this embodiment, the drivable member 130c is in the form of an impeller that comprises a boss 505, wherein a plurality of blades 510 (in this case five blades) extend radially outwardly from the boss 505. The blades 510 are open blades, i.e., whilst one end of each blade 510 is fixed to the boss 505, the other end of each blade 510 is left free and unconnected to any other member. The boss 505 is mountable to the drive shaft 135 and the blades 510 are obliquely angled to the direction of fluid flow/the drive shaft 135, such that, in use, fluid flow over the impeller acts on the blades 510 so as to cause the impeller to rotate.

Figure 14:
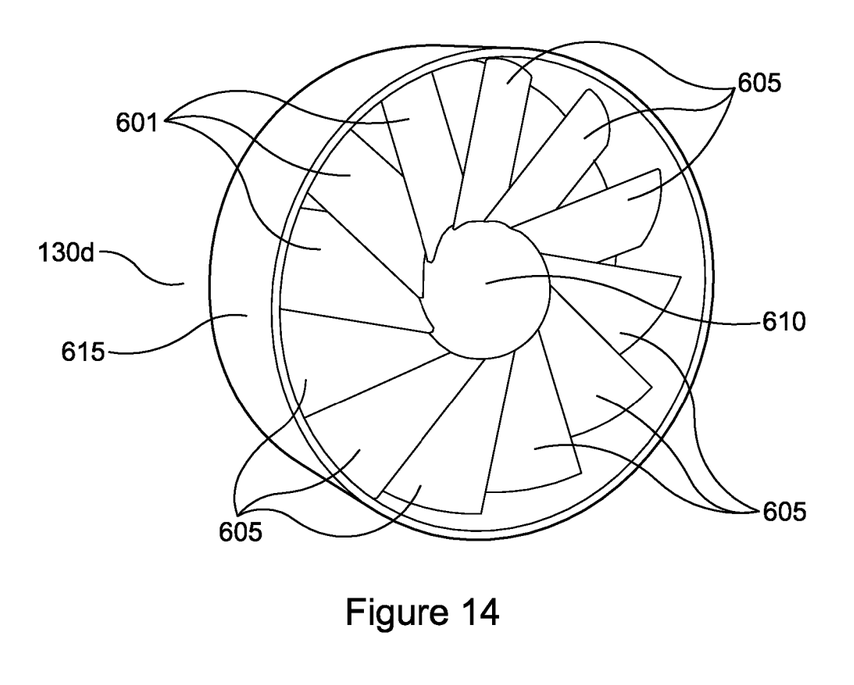
FIG. 14 shows a perspective view of a drivable member in the form of an impeller for use with a power generator.

A preferred example of a drivable member 130d for use in embodiments of the present invention is shown in FIG. 14. In this embodiment, the drivable member 130d is in the form or an impeller that comprises a plurality of obliquely angled blades 605 extending radially outwardly from a boss 610 to an annular member 615 provided outwardly of the blades 605 and boss 610, such that the blades 605 are bounded at respective ends by the boss 610 and the annular member 615 and the annular member 615 rotates integrally with the blades 605. In this particular embodiment, the annular member 615 takes the form of a thin annular ring that extends around the blades 605. It will be appreciated that this impeller is a closed impeller, i.e. the blades 605 are bounded at each end, in this instance by the boss 610 and the annular member 615. The boss 610 is connectable to the driveshaft 135. Advantageously, the impeller of FIG. 14 comprises more blades (in this case 12 blades) than the impeller of the embodiment of FIG. 13 and presents a high blocking factor to fluid flow. This type of impeller 130d (which may be termed a mixed flow impeller) is particularly advantageous in constrained fluid flow over the drivable member, as is the case in embodiments of the present invention.

Figure 15:
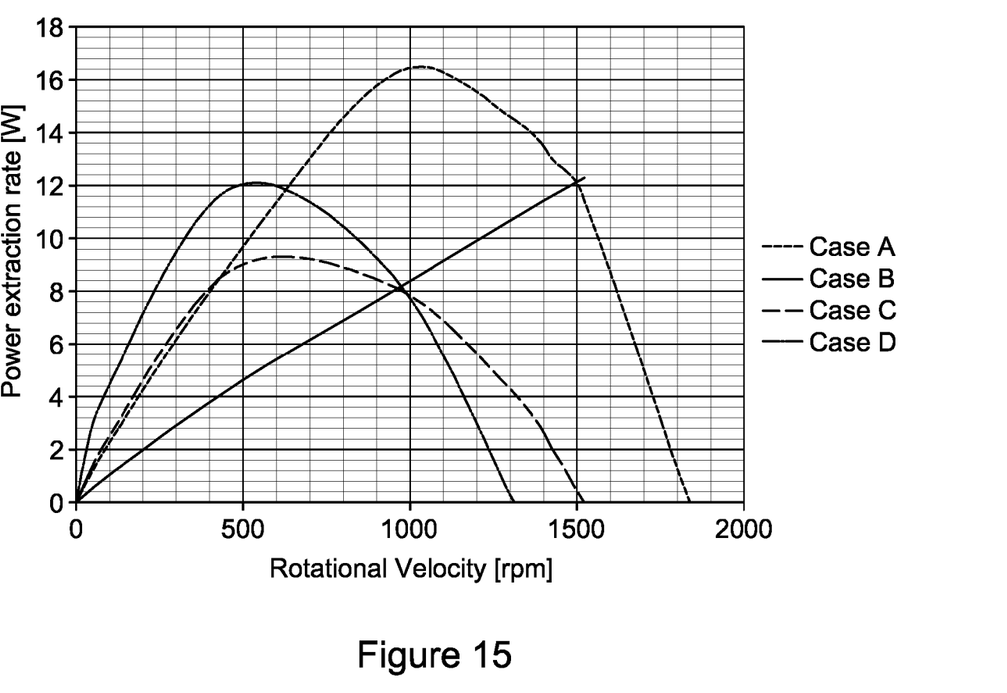
FIG. 15 shows the variation of power extraction rate with rotational velocity achievable using the drivable members of FIGS. 11 to 14.

A comparison of the relative power extraction rate with rotational speed for each of the above drivable members 130a, 130b, 130c, 130d is shown in FIG. 15. As can be seen from FIG. 15, the impeller 130d of FIG. 14 offers the best performance at lower rotational speeds, whereas the grooved screw member 130a of FIG. 11 offers the highest power extraction rate, albeit at much higher rotational speeds. In embodiments, the drivable member 130 is configured to be self limiting, for example, by being designed to have a maximum rotation speed. In this way, the power generator 105 can inherently prevent excessive power generation which could otherwise damage the power generator itself. This allows a single design to be used over a large range of fluid flow conditions.

In view of the above, the choice of impeller can be determined based on operational requirements. For example, slower rotation speed can allow for improved sealing and seal life. Therefore, for generator arrangements that are sealed in some form, the impeller 130d shown in FIG. 14 can be preferable.

However, it will be appreciated that the generator apparatus 155 need not be sealed. For example, at least the generator magnets 150 and/or bearings 140, 145 could be left open to the flowing fluid. In some embodiments, depending on the nature of the flowing fluid, the flowing fluid can act to cool and/or lubricate the bearings 140, 145 and/or generator magnets 150 and/or generator windings 160. On the other hand, a sealed generator apparatus 155 can reduce erosion of components such as the bearings 140, 145 and/or generator magnets 150 and reduce the risk of particulate matter blocking or otherwise damaging the generator apparatus 155. One option is to use partial seals 230, such as wiper seals, which present a barrier to particulate matter but allow at least some fluid to pass.

Figure 16:
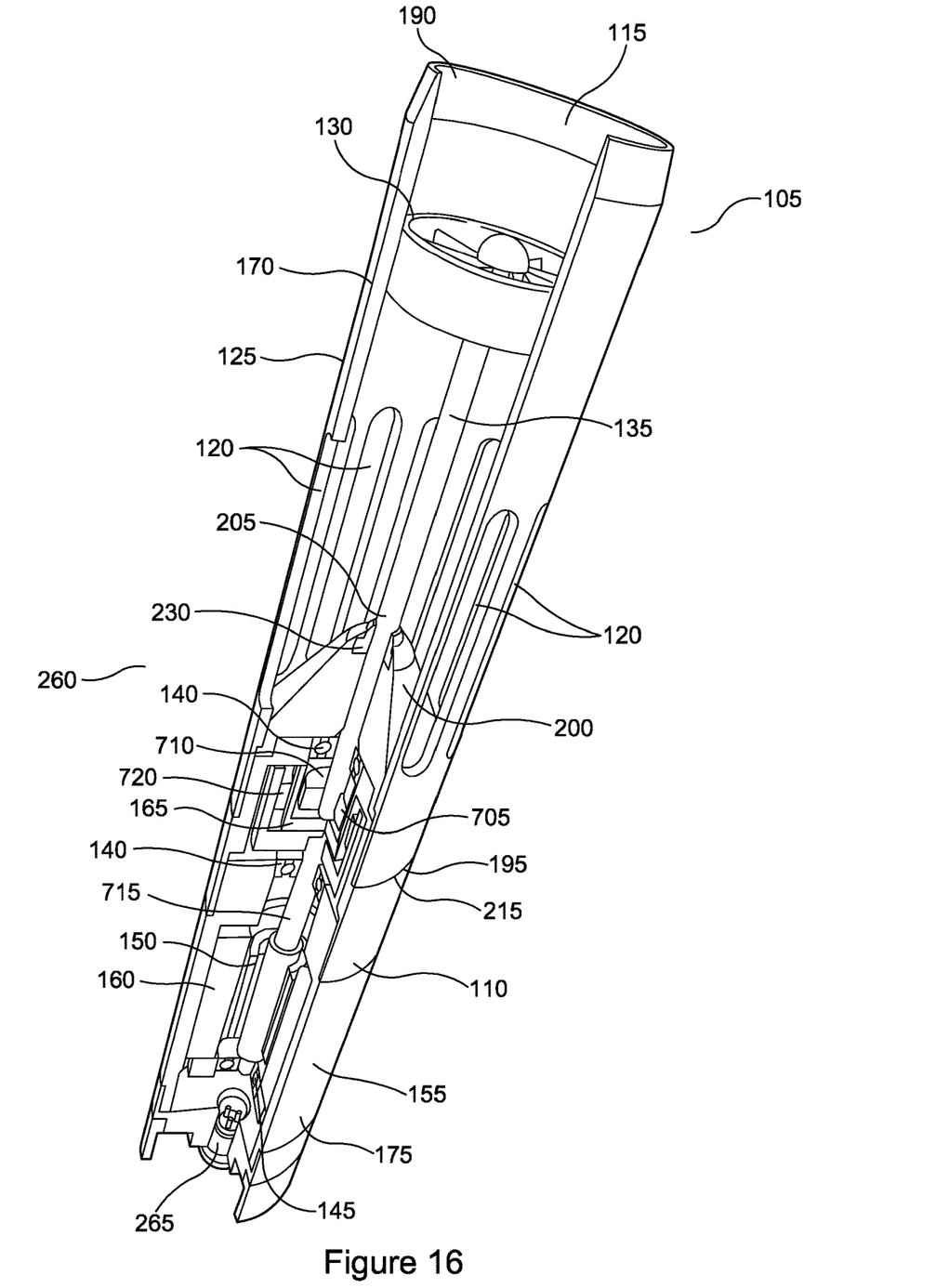
FIG. 16 shows a cut-away perspective view of a power generator according to embodiments of the present invention.

Another option is to provide a magnetic coupling 705 between the drivable member 130 and the generator magnets 150 and/or generator windings 160. An example of this arrangement is shown in FIG. 16. This embodiment of the power generator 105 is substantially similar to those shown and described above in relation to FIGS. 2 to 9 but instead the drivable member 130 is mounted to a drive shaft 135a, wherein an end of the drive shaft 135a opposite the drivable member 130 is provided with a plurality of first coupling magnets 710. The generator magnets 150a are mounted on a generator (or rotor) shaft 715 that is separate from the drive shaft 135 and a plurality of second coupling magnets 720 are provided at an end of the generator shaft 715 closest to the drive shaft 135a. The first coupling magnets 710 of the drive shaft 135a and the second coupling magnets 720 of the generator shaft 715 are configured such that rotation of the first coupling magnets 710 results in a magnetic force being exerted on the second coupling magnets 720 so as to cause the second coupling magnets 720 and thereby the generator shaft 715 to correspondingly rotate with the drive shaft 135a. For example, one way of providing this magnetic coupling effect would be to provide alternating magnetic poles circumferentially on the drive shaft 135a and corresponding alternating magnetic poles on the generator shaft 715 so that rotation of the drive shaft 135a creates repulsive/attractive magnetic forces on the magnetic poles provided on the generator shaft 715 that cause it to also rotate.

Advantageously, a part of the housing that acts to close off the first end of the generator housing 175 extends between the first coupling magnets 710 on the drive shaft 135a and the second coupling magnets 720 on the generator shaft 715 so as to form a barrier 165a to prevent ingress of fluid to the interior of the generator housing 175. In this way, torque can be transmitted from the drivable member 130 to the generator shaft 715 whilst at the same time bearings 140a, 145a supporting the generator shaft 715, the generator magnets 150a and the generator windings 160 can be isolated from the flowing fluid that drives the drivable member 130 without the use of seals 230 that may be prone to failure and/or have a limited lifetime.

In an alternative magnetic coupling arrangement, the magnetic coupling 705a can be integrated with the generator apparatus 155. For example, the generator magnets 150b may also be used as one of the sets of magnets 710, 720 of the magnetic coupling 705a and the barrier 165b forming part of the generator housing 175 may extend between the coupling magnets 710 mounted on the drive/generator shaft 135, 715 and the generator magnets 150b, so as to seal off the generator magnets 150b and the generator windings 160 from the flowing fluid. This arrangement reduces the number of components used at the expense of width of the power generator 105.

By providing a magnetic coupling 705, 705a that spans a pressure barrier 165, 165a, 165b, the requirement for seals such as rotary seals can be reduced or eliminated as sensitive components such as the generator windings 160 (i.e. a stator) and any electronic components can be provided on a dry side of the pressure barrier 165, 165a, 165b, whereas other components such as the generator magnets 150 (i.e. a rotor) can be exposed to the fluid.

While certain embodiments have been described, these embodiments have been presented by way of example only, and are not intended to limit the scope of the inventions. Indeed the novel methods and systems described herein may be embodied in a variety of other forms. Furthermore, various omissions, substitutions and changes in the form of the methods and systems described herein may be made without departing from the spirit of the invention. The accompanying claims and their equivalents are intended to cover such forms and modifications as would fall within the scope of the invention.

For example, whilst embodiments have been described above in which the drivable member 130 and the generator magnets 150 are mounted on a common shaft 135, it will be appreciated that the generator magnets 150 and the drivable member 130 may be mounted on different shafts 135, 715 that are coupled together or otherwise arranged for cooperative rotation. For example, the generator magnets 150 may be mounted on a generator shaft 715 that is separate from the drive shaft 135 upon which the drivable member 130 is mounted and which may or may not be co-axial with the drive shaft 135. The drive and generator shafts 130, 715 may be coupled using any suitable means known in the art such as spline coupling, belt and pulley coupling, magnetic coupling, and the like.

Furthermore, although various specific examples of drivable members 130a, 130b, 130c, 130d have been described, it will be appreciated that the present invention is not limited to such drivable members and alternative drivable members that would be known to a person skilled in the field may be used.

Whilst the specific examples of power generator 105 described herein comprise a single drivable member 130, it will be appreciated that a plurality of drivable members 130 may be provided. It will be further appreciated that the plurality of drivable members 130 may comprise the same or different types of drivable member. For example, an embodiment of power generator may be provided with a grooved member 130a at an upstream end of the drive shaft and an impeller (e.g. a mixed flow impeller 130d) downstream of the grooved member 130a.

Furthermore, although the above embodiments are advantageously configured with the generator magnets 150 rotating (e.g. being comprised in a rotor) and the generator windings 160 stationary (e.g. being provided in a stator), it will be appreciated that embodiments may comprise the reverse arrangement, i.e. the generator magnets 150 may be comprised in a stator whilst the generator windings 160 may be comprised in a rotor.

Furthermore, although the generator magnets 150 and/or coupling magnets 710, 720 may comprise permanent magnets, it will be appreciated that other magnet types such as electromagnets could optionally be used.

In addition, although certain components such as the housing 110 and the drivable member 130 may be formed from specific materials such as stainless steel and/or titanium, it will be appreciated that other suitable materials and construction could also be used.

Whilst the above embodiments are described in relation to a downhole electrical power generator, for example, for use in a well or borehole 10, preferably comprising a tubular lining 5, it will be appreciated that the power generator 105 need not be limited to this application but could instead be used in a variety of alternative applications that comprise flowing fluid, particularly when the flow is constrained in some way, e.g. by flowing in a conduit such as a pipeline or the like.

Although the power generator 105 is advantageously coupled to a battery unit 40 in order to charge the battery unit 40 (to thereby provide continuously available power), it will be appreciated that this need not be the case and instead, the power generator 105 could be used to directly power one or more pieces of apparatus 15 and/or be coupled to another type of power storage device. For example, the power generator 105 could be used to charge a capacitor, accumulator, compressed air device or any other suitable type of power storage device known in the art. Furthermore, although various embodiments of the present invention can be used to power sensors 35 such as pressure sensors and/or communications systems it will be appreciated that the apparatus that may be powered by the power generator 105 is not limited to these examples.

The invention claimed is:

1. A power generator for use in a bore, the power generator comprising:
   at least one drivable member;
   at least one generation apparatus; the generation apparatus including,
      at least one generator magnet configured to produce a magnetic field;
      at least one electrically conductive member located or locatable within the magnetic field; and
   a housing including an axial length, a cylindrical shroud member defining a cylindrical hollow, an axial inlet and a plurality of radial outlets arranged circumferentially around a side wall of the housing, and a dome shaped protrusion defined by the cylindrical shroud member and located inside the cylindrical hollow of the cylindrical shroud member that protrudes axially inwardly towards the axial inlet to direct the flow radially out through the plurality of radial outlets, wherein the plurality of radial outlets are located along the axial length of the housing prior to the generation apparatus so as to direct a flow of fluid out of the housing in a radial direction;
   wherein the drivable member is drivable by fluid flowing from the axial inlet to the plurality of radial outlets of the housing so as to produce relative motion of the at least one magnet and the at least one electrically conductive member in order to induce a current in the at least one electrically conductive member.

2. The power generator according to claim 1, wherein the power generator is configured to be located in a pipeline, a wellbore, or both a pipeline and a wellbore.

3. The power generator according to claim 1, wherein the power generator is elongate and, in use, the longitudinal direction of the power generator extends in the direction of fluid flow.

4. The power generator according to claim 1, wherein the at least one drivable member is coupled or coupleable to the at least one generation apparatus via at least one magnetic coupling.

5. The power generator according to claim 4, wherein the magnetic coupling comprises at least first and second cooperatively arranged coupling magnets configured such that rotation of the first coupling magnets acts to exert a magnetic force on the second coupling magnets, the exerted magnetic force acting to rotate the second coupling magnets and a screen or barrier is provided between the first and second set of magnets.

6. The power generator according to claim 1, wherein the at least one drivable member comprises an impeller comprising a plurality of blades.

7. The power generator according to claim 6, wherein the impeller comprises an annular member and a part of at least one blade of the impeller is fixed, attached, mounted to or integral with the annular member.

8. The power generator according to claim 1, wherein the at least one drivable member comprises at least one protrusion, wherein at least part of the protrusion is obliquely oriented to the direction of fluid flow in use.

9. The power generator according to claim 1, wherein the power generator comprises, is connected, or is connectable to a battery and the generation apparatus is configured to trickle charge the battery.

10. The power generator according to claim 1, wherein the at least one drivable member is coupled to the at least one generation apparatus via a gearing mechanism and the gearing mechanism is arranged such that a rotation speed input to the gearing mechanism by one of a drive shaft or the drivable member is lower than a rotation speed output by the gearing mechanism to the generation apparatus.

11. A downhole assembly comprising at least one powered device and at least one power generator according to claim 1.

12. A downhole assembly according to claim 11, wherein the at least one powered device comprises, is comprised in or is associated with at least one of a sensor, measurement device, diagnostic device, communications device, and control device.

13. A method for generating power comprising providing a power generator according to claim 1 and exposing the drivable member of the power generator to fluid flow in order to drive the drivable member.

14. A method for installing a power generator downhole, the method comprising providing a power generator according to claim 1 in a bore.

15. The power generator according to claim 1, wherein the at least one drivable member comprises at least one protrusion, and at least part of the at least one protrusion is obliquely oriented to the direction of fluid flow in use.

* * * * *